C. K. Bradford.
Velocipede.
Nº 83035. Patented Oct. 13, 1868.

Witnesses.
Geo A. Loring.
Edward Griffith.

Charles K. Bradford
by his Attorney
Frederick Curtis

C. K. BRADFORD.
Velocipede.

No. 83,035.

2 Sheets—Sheet 2.

Patented Oct. 13, 1868.

Diagram of rope n.

Witnesses:
Geo. A. Loring.
Edward Griffith.

Inventor:
Charles K. Bradford.
by his attorney
Frederick Curtis.

United States Patent Office.

CHARLES K. BRADFORD, OF LYNNFIELD, MASSACHUSETTS.

Letters Patent No. 83,035, dated October 13, 1868.

IMPROVEMENT IN VELOCIPEDES.

The Schedule referred to in these Letters Patent and making part of the same.

*To all to whom these presents shall come:*

Be it known that I, CHARLES K. BRADFORD, of Lynnfield, in the county of Essex, and State of Massachusetts, have made an invention of certain new and useful Improvements in a Species of Vehicles known as "Velocipedes;" and do hereby declare the following to be a full, clear, and exact description thereof, due reference being had to the accompanying drawings, making part of this specification, and in which—

Figure 1:
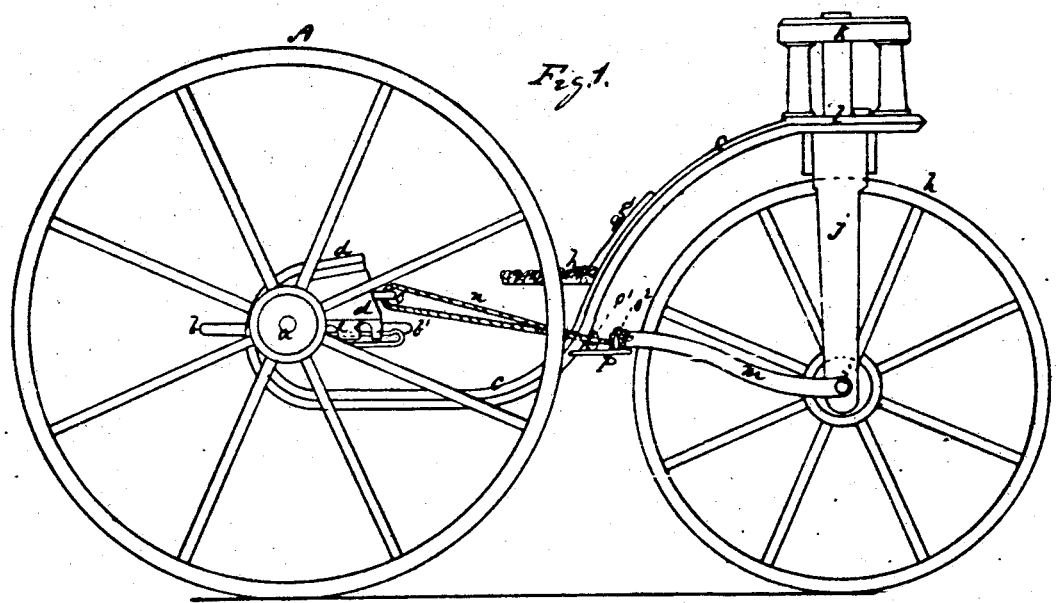
Figure 2:
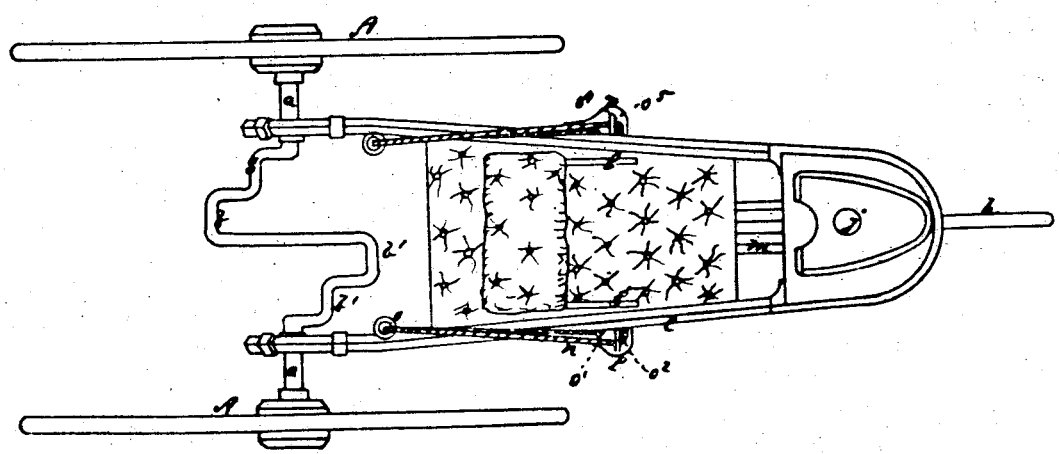
Figure 3:
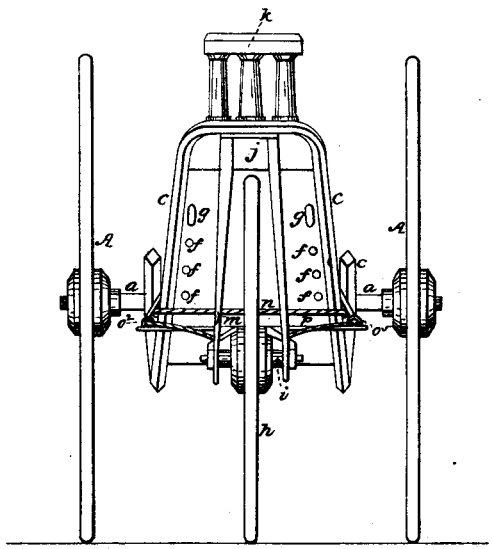
Figure 3:
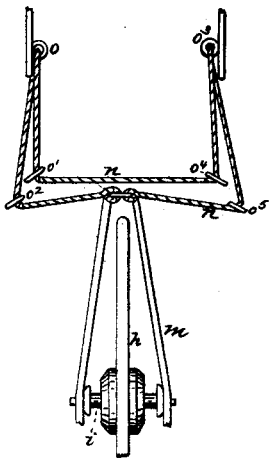

Figure 1 is a side elevation.
Figure 2 a plan, and
Figure 3 a rear elevation of a velocipede constructed as contemplated by my invention.

This invention relates, first, to means for enabling the rider or operator of the vehicle to regulate or vary the amount of power applied by him to propel the vehicle, according to the varying conditions of the surface or the grade of the road over which the vehicle is propelled.

Secondly, the invention relates to means for obtaining a more perfect control of the direction or "steering" of the vehicle, than has heretofore been accomplished in objects of a similar nature.

And lastly, the invention relates to means for varying the position of the seat of the rider or operator, with respect to the propelling or driving-cranks of the vehicle, in manner as hereinafter referred to.

This invention consists—

First, in the employment of a compound crank-shaft, that is, of a shaft composed of or provided with two or more cranks of different lengths, the longer of which are to be employed when ascending an inclined plane or grade, and when more power and less speed is desired, and the smaller to be brought into use when the vehicle is traversing a comparatively level and smooth plane, and a greater rate of speed is desirable, and a less amount of power is required.

And this invention further consists in a novel employment of a rope or chain for steering the vehicle, and its application directly, or nearly so, to the axis of revolution of the third or steering-wheel of the vehicle, by means of which a much more direct and powerful control is had over this wheel than would be the case were the power applied, as is now generally the case, at a greater or less distance from such axis.

And further, the invention consists in applying the rider's seat to the frame or body of the vehicle, in such manner as to readily vary the height of such seat with respect to the remainder of the vehicle.

And lastly, the invention consists in supporting the forward end of the body of the vehicle upon the driving-shaft, in such manner as to increase or diminish the distance of the rider's seat from such shaft, for the purpose substantially as hereinafter explained.

In the drawings above mentioned as accompanying this specification, and illustrating my invention, and in the different figures of which like letters denote like parts, the main supporting-wheels of the vehicle are shown at A A as suitably supporting a driving-shaft, $a$, this shaft being provided with a series of twin-cranks, $b\ b\ b'\ b'$, of different lengths and power, applied to opposite sides of the centre thereof.

This shaft supports the forward end of the frame or body, $c$, of the vehicle, this body being composed, in the present instance, of a skeleton frame, made of a metallic bar bent into the form of a yoke, and applied to the wheels in such manner as to rise rearward therefrom at a considerable angle, and in a curved form, substantially as shown in fig. 1 of the drawings, or somewhat resembling an attenuated letter S.

The body, $c$, of the vehicle is applied to the shaft $a$ in such manner as to vary its position thereon, in order to accommodate the distance of such body and its seat from the shaft to the length of the legs of the rider.

As shown in the present instance, this adjustable connection is made by applying to the forward ends of the yoke of the body, two cheeks or supports, $d\ d$, provided with a series of notches, $e\ e$, &c., at their lower parts, for straddling opposite ends of the driving-shaft, and between its outer cranks and the wheels A A, a bolt or other device being extended through the lower edge of the cheeks $d\ d$ to retain them in proper position upon the shaft, but which allows of this position being readily changed at any time.

The rear and inclined portion of the yoke or body of the vehicle may be covered or upholstered in any desirable manner, and its opposite sides are to be punctured with rows of holes $f\ f$, these holes being for reception of two bent rods, $g\ g$, applied to the rear side of the seat, shown at $h$ in the drawings, such holes and rods serving to secure such seat to the frame, and at the same time allow of its position thereon being changed at any time to accommodate the height of the seat to the tastes of different individuals.

The rear and steering-wheel of the vehicle is shown at $h$ as revolving upon a short axle, $i$, inserted within the lower end of an upright slotted post or standard, $j$, which swivels within bearings $k\ l$, applied to or making part of the rear extremity of the body of the vehicle.

A horizontal forked bar, $m$, straddles the wheel $h$, and with the rear extremities of its arms pivoted to the ends of the axle $i$, while the shank or front extremity of the fork has affixed to it the two ends of a rope or chain, $n$, such rope being passed through eyes or pulleys $o\ o^1\ o^2$ or $o^3\ o^4\ o^5$, applied respectively to opposite sides of the forward end of the body of the vehicle, and to the rear of the back of the rest of such body, or to a shelf, $p$, fixed thereon, the ends of the rope being first carried through the guides $o^1\ o^4$, thence through the guides $o$ and $o^3$, and returned through the guides $o^2$ and $o^5$, and then secured to the forked bar $m$, as before mentioned.

The rider or operator of the vehicle, by seizing the portion of the rope between the guides $o\ o^1$ and $o^3\ o^4$, is enabled, as will readily be seen, upon pulling upon one side, and relaxing the other, to turn the steering-wheel in any direction, while by keeping both sides of the rope taut, the wheel is held very firmly in one position.

The hold upon the rope also serves, to a considerable extent, to enable the rider to keep a firm seat.

The above description of the construction of my invention will enable intelligent mechanics to manufacture it, while its use will manifest itself to any one of ordinary intelligence.

One advantage of the invention over others, is the fact that by the employment of the compound crank, as before described, increased power may be applied to drive the vehicle up an inclined plane, or over a rough road, by changing the feet of the driver from the smaller to the larger cranks, and *vice versa*. When riding on a level plane, or a descent upon a very smooth road, the use of the smaller cranks enables the vehicle to attain increased speed with the application of little power.

Another advantage, which will readily make itself apparent, is, that by applying the forked bar to the axis, or thereabouts, of the steering-wheel, a perfect control is had over the movement of such wheel.

Another great advantage results from the ability to change the position of the seat, as well as to vary the distance of such seat from the driving-crank.

Still another advantage results from the use of the back or rest of the body of the vehicle, as by means of it a bearing is obtained whereby to increase the leverage upon the cranks of the driving-shaft, as well as to enable the operator to propel the vehicle with much greater ease, and with less fatigue, than has heretofore been possible.

I claim as my invention, and desire to secure by Letters Patent of the United States, as follows:

1. I claim connecting the body of a velocipede to its driving-shaft, in such manner as to vary the position of such body, and its seat, with respect to such driving-shaft, in manner and for the purpose as hereinbefore explained.

2. I claim combining with a velocipede a compound crank, or series of cranks, or eccentrics of different radii, for enabling the speed and power of the vehicle to be varied, essentially as herein shown and described.

3. I claim the arrangement of the rope $n$, or its equivalent, as affixed to the forked bar $m$, and supported and guided by the guides $o\ o^1\ o^2\ o^3\ o^4\ o^5$, or their equivalents, substantially as before described, and herein shown.

4. The combination, with the body of a velocipede, of a seat adjustable thereon, substantially in the manner and for the purposes set forth.

5. The combination of the body of a velocipede, formed as described, and its adjustable seat, with a compound crank, or its equivalent, substantially as and for the purposes set forth.

CHAS. K. BRADFORD.

Witnesses:
GEO. A. LORING,
FRED. CURTIS.